United States Patent [19]

Iizuka et al.

[11] Patent Number: 4,863,116
[45] Date of Patent: Sep. 5, 1989

[54] GUIDE MEMBER IN A CASSETTE FOR DATA CARRYING MATERIAL

[75] Inventors: Michio Iizuka; Haruo Shiba; Masatoshi Okamura, all of Tokyo, Japan

[73] Assignee: TDK Corporation, Japan

[21] Appl. No.: 457,257

[22] Filed: Jan. 12, 1983

[30] Foreign Application Priority Data

Jan. 18, 1982 [JP] Japan ............................. 57-4054[U]
Jan. 19, 1982 [JP] Japan ............................. 57-4570[U]

[51] Int. Cl.⁴ .................... B65H 27/00; G11B 23/087
[52] U.S. Cl. ..................................... 242/199; 242/76
[58] Field of Search ............... 242/76, 197, 198, 199, 242/200, 194, 55, 19 A; 226/196; 384/129, 130; 360/132

[56] References Cited

U.S. PATENT DOCUMENTS

| | | | |
|---|---|---|---|
| 3,863,853 | 2/1975 | Umeda | 242/55.19 A |
| 4,076,186 | 2/1978 | Oishi et al. | 242/199 |
| 4,168,043 | 9/1979 | Shiba | 242/199 |
| 4,254,923 | 3/1981 | Ishida et al. | 242/199 |
| 4,371,131 | 2/1983 | Okamura et al. | 242/199 |

FOREIGN PATENT DOCUMENTS

| | | | |
|---|---|---|---|
| 2246362 | 3/1973 | Fed. Rep. of Germany | 242/199 |
| 2151386 | 4/1973 | Fed. Rep. of Germany | 242/199 |

Primary Examiner—Philip R. Coe
Assistant Examiner—Scott J. Haugland
Attorney, Agent, or Firm—Steinberg & Raskin

[57] ABSTRACT

An improved guide member assembly in a cassette for guiding the travel of web-like data carrying material includes a support base provided on the cassette, a supporting shaft mounted on the support base, guide means rotatably mounted on the supporting shaft having a peripheral data carrying material guiding surface and fluid lubricant disposed between the supporting shaft and guide means. A device is provided for reliably preventing any of such fluid lubricant from accumulating on and adhering to the data carrying material guiding surface of the guide means.

10 Claims, 4 Drawing Sheets

GUIDE MEMBER IN A CASSETTE FOR DATA CARRYING MATERIAL

BACKGROUND OF THE INVENTION

This invention relates to guide member assemblies for use in cassettes for web-type data carrying material, such as magnetic tape, typewriter ribbon, filmstrip or the like, for guiding the data carrying material along a predetermined path of travel in the cassette.

Various types of cassettes for data carrying material have been proposed. These cassettes are provided with guide pins or rotatable guide member assemblies for smoothly guiding the travel of the data carrying material along a predetermined path in the cassette. Generally, such guide member assemblies comprise guide means in the form of a plastic cylindrical roller body, rotatably supported by a pin formed of metal or other material and one ed of which is embedded in a casing half of the cassette. Lubricant is applied between these elements to provide a smooth rotation of the guide roller body on the pin.

However, a problem which often occurs in conventional mechanisms is that the applied fluid lubricant seeps or leaks from the space between the lower ends of the roller body and pin and runs along the lower end face of the guide roller body whereupon it accumulates on and adheres to the peripheral data carrying material guiding surface of the guide roller body. This in turn results in an adherence of the lubricant to the data carrying material itself which travels into contact with the guiding surface of the guide roller body. This is indeed a serious problem and often results in malfunctioning of the cassette as well as the mechanism in which the cassette is used.

SUMMARY OF THE INVENTION

Accordingly, one object of the present invention is to provide a new and improved guide member assembly in a cassette for data carrying material for guiding the travel of the data carrying material along a predetermined path in the cassette.

Another object of the present invention is to provide a new and improved guide member assembly in a cassette for data carrying material, the guide member assembly being specifically designed so as to maintain its data carrying material guiding surface substantially free of fluid lubricant.

Other objects and advantages of the invention will be apparent from the specification.

Generally speaking, in accordance with the present invention, these and other objects are attained by providing a rotatable guide member assembly in a cassette for web-type data carrying material for guiding the travel of the data carrying material along a predetermined path of travel in the cassette. The rotatable guide member assembly comprises a support base provided on the cassette, a supporting shaft member mounted on to extend from the supporting base, a guide means rotatably mounted on the supporting shaft member, the guide means having a data carrying material guiding surface and upper and lower ends, fluid lubricant provided between the supporting shaft member and the guide means, and means for preventing the fluid lubricant from accumulating on and adhering to the data carrying material guiding surface of the guide means.

In a preferred embodiment of the invention, the means for preventing the fluid lubricant from accumulating on and adhering to the data carrying material guiding surface of the guide means includes a peripherally extending flange provided around the lower end region of the guide means.

According to another feature of a preferred embodiment, the support base is formed as a protuberance from the inner wall surface of the cassette and has a substantially flat top end face, and the flange is designed so as to have a diameter which is greater than the substantial diameter of the flat top end face of the support base.

The invention accordingly comprises the features of construction, combination of elements, and arrangement of parts which will be exemplified in the construction hereinafter set forth, and the scope of the invention is set forth in the claims appended hereto.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

In the following description, reference will be made to the invention as incorporated in a cassette wherein videotape comprises the data carrying material. However, it will be understood that the invention is equally applicable to other forms and types of cassettes such, for example, as cassettes for audiotape, filmstrips, typewriter ribbon and the like.

Figure 1:
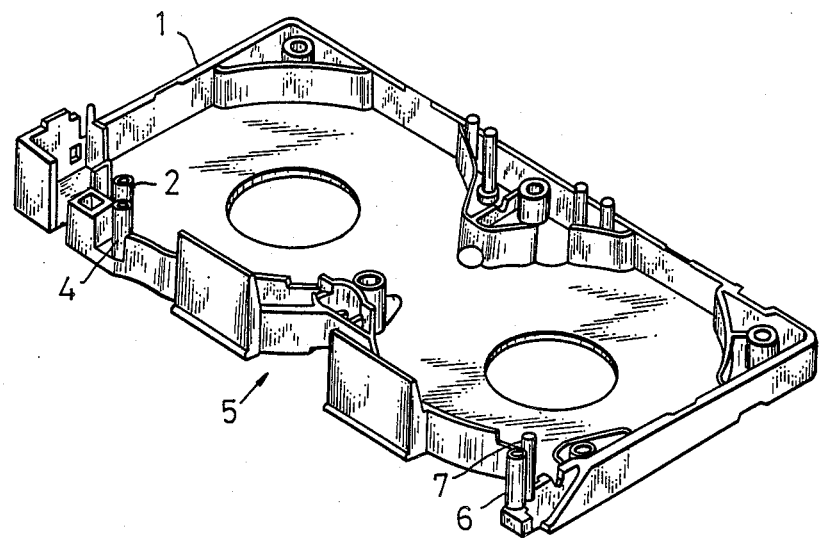
FIG. 1 is a perspective view of a lower casing half of a videotape cassette incorporating an embodiment of the guide member assembly in accordance with the present invention.
Figure 2:
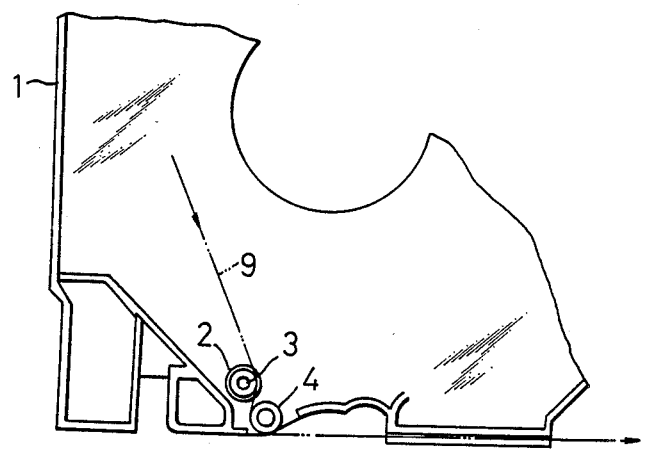
FIG. 2 is an enlarged plan view of a section of the videotape cassette illustrated in FIG. 1.

Referring now to the figures wherein like reference characters designate identical or corresponding parts throughout the several views and, more particularly, to FIGS. 1 and 2, the lower casing half 1 of a typical videotape cassette is illustrated, it being understood that the cassette comprises an upper casing half (not shown) which is designed to appropriately mate with the lower casing half 1 in a well known manner. The lower casing half 1 is designed to house a pair of rotatable tape hubs (not shown) on which the videotape 9 is wound. The tape 9, which is fed from the feed side hub located in the upper left portion of the casing half 1 as seen in FIG. 1, passes around a rotatable guide member assembly including a rotatable guide member 2 fitted on a pin 3 and then around a guide pin 4. Both of the pins 3 and 4 extend upwardly from the lower casing half 1. The tape further passes along the front portion 5 of the cassette and then around the guide pin 6 and 7 to proceed to the take-up hub situated in the lower right portion of the casing half 1 as seen in FIG. 1.

Figure 3:
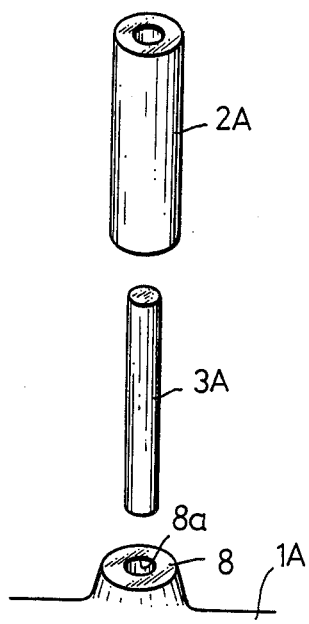
FIG. 3 is an exploded perspective view illustrating the components of a conventional rotatable guide member assembly.
Figure 4:
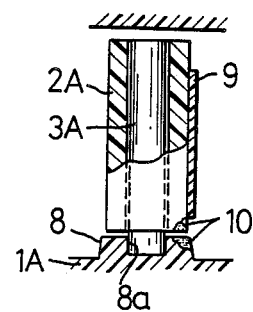
FIG. 4 is a side elevation view in partial section of the conventional guide member assembly illustrated in FIG. 3 and installed in a cassette.

Referring now to FIGS. 3 and 4, a conventional rotatable guide member assembly is shown comprising a rotatable guide member 2A in the form of a plastic cylindrical body, the guide member 2A being supported by a pin 3A made of metal or other suitable material. The pin 3A is fitted in a cavity 8a formed in a pin support/guide mount 8 provided on the lower casing half 1A of the cassette.

A lubricant 10 (FIG. 4) is applied between the rotatable guide member 2A and the pin 3A to insure smooth rotation of the guide member 2A on the pin 3A. However, over an extended period of use of the device, the lubricant 10 leaks or seeps out from the region of the lower end of the pin 3A and runs between the lower end face of the guide member 2A and the upper face of the guide mount 8 whereupon the fluid lubricant accumulates on and adheres to the outer peripheral surface of the guide member 2A as shown in FIG. 4. As a consequence, the lubricant may also adhere to the videotape 9 which travels into contact with the peripheral surface of the rotatable guide member 2A thereby possibly causing malfunctions.

Figure 5:
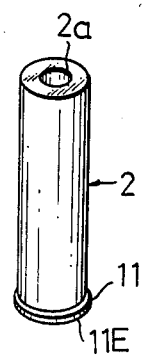
FIG. 5 is a perspective view of a rotatable guide member assembly in accordance with an embodiment of the present invention.

A rotatable guide member assembly in accordance with one embodiment of the present invention will now be described with particular reference to FIGS. 5 and 6.

A supporting base or guide mount 80 which also functions as a pin support, is provided on the lower casing half 1 of the cassette. The support/guide base 80 is integrally formed with the lower casing half 1 of the cassette in the form of a protuberance extending from the inner surface thereof and having a substantially flat circular top face 80S with a cylindrical cavity 80a being centrally formed therein for rigidly supporting the pin 3. One end of the pin 3 is embedded within the cavity 80a so that the pin extends vertically upwardly from the base 80. A guide member 2 is rotatably fitted over the pin 3 by inserting the pin within the bore 2a of the guide member 2. Lubricant 10 is provided between the guide member and pin as seen in FIG. 6.

The rotatable guide member 2 comprises a cylindrical body having an axial bore 2a formed therethrough and is preferably molded of a suitable material, such as Teflon polyacetal resin or similar low friction plastic material.

In accordance with this embodiment, a circular flange 11 is provided on the lower end of the rotatable guide member 2 extending outwardly from the periphery thereof. The flange 11 may be formed integrally with the guide member 2 during the molding operation or, if desired, a separate ring member may be appropriately secured to the lower end of the guide member 2. Moreover, as will be clearer below, it is desirable that the flange 11 have a diameter which is greater than that of the flat top face 80S of the guide base 80 which also functions as the support for the pin 3. Furthermore, it is also desirable that the flange 11 have a sharp peripheral edge portion 11E at a bottom corner thereof.

Figure 6:
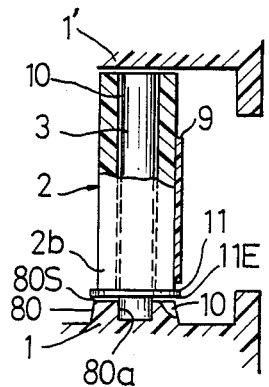
FIG. 6 is a side elevation view in partial section of the guide member assembly illustrated in FIG. 5 installed within a cassette.

According to this construction of the guide member assembly, even if the fluid lubricant 10 which is present between the pin 3 and the guide member 2 should seep or leak out into the space defined between the flange 11 (which is rotating with the guide member 2) and the guide base 80 as shown in FIG. 6, such seeping lubricant 10 will be compelled to flow in a downward direction from the bottom surface of the flange 11 or from the sharp peripheral edge portion 11E of flange 11 to the under side of the flange, possibly onto the face of the base 80, due to the gap between the levels of the opposed flange and base surfaces created by the difference in diameters of the flange 11 and top face 80S of base 80 and also under the action of centrifugal force produced by the rotation of the guide member 2. In this manner, the risk of the seeping lubricant accumulating on and adhering to the peripheral surface 2b of the guide 2 or the tape 9 is completely eliminated.

Referring to the prior art construction illustrated in FIG. 4, it might superficially appear that the desired effect could be achieved by providing the diameter of the mount 8 to be smaller than that of the guide member 2A. However, in practice, this is not the case. Thus, it was found that the desired effects of centrifugal force, i.e., the throwing or flinging of the lubricant from the flange, can be obtained only when the flange 11 is provided as described above and only this arrangement can effectively inhibit the seeping lubricant from passing around onto the peripheral surface 2b of the guide member 2.

It is noted that in the illustration of FIG. 6, the videotape cassette is designated by the lower casing half 1 and the upper casing half 1'.

Figure 8:
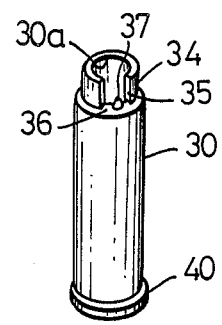
FIG. 8 is a perspective view illustrating another embodiment of a rotatable guide member assembly in accordance with the present invention.
Figure 9:
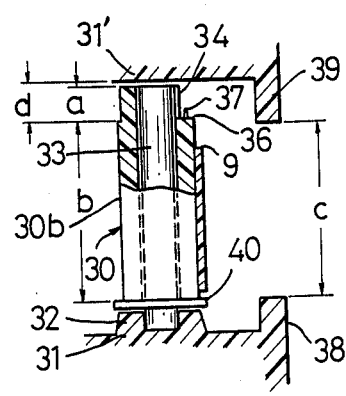
FIG. 9 is a side elevation view in partial section of the rotatable guide member assembly illustrated in FIG. 8 installed in position in a videotape cassette.
Figure 10:
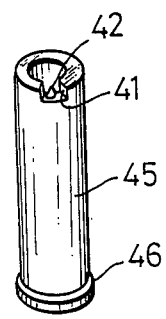
FIG. 10 is a perspective view of a rotatable guide member assembly according to still another embodiment of the present invention.

Another embodiment of a guide member assembly in accordance with the present invention is illustrated in FIGS. 8–10.

According to this embodiment, a guide member assembly is provided which, in addition to having the above-described advantageous operation, has the additional advantage that it eliminates any deleterious effect which might be created by irregularities in the formation of the guide member which originate from the casting or poring gate in the form of flash or the like which is unavoidable in the molding of the plastic guide member.

Figure 7:
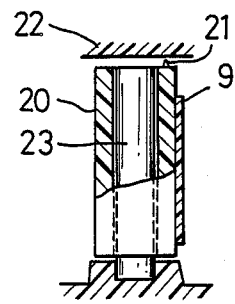
FIG. 7 is a side elevation view in partial section of a conventional rotatable guide member assembly wherein a typical flash from the mold gate is formed on the guide means.

Firstly, the problems resulting from the presence of flash or the like originating from the casting gate in prior art constructions will be described with particular reference to FIG. 7 which illustrates a conventional guide member assembly.

The rotatable guide member 20 is generally made by conventional plastic molding techniques so that flash 21 or the like formed due to the presence of the casting gate in the mold will be unavoidably left on the guide member 20. Of course, no problem arises if such material (hereinafter referred to as gate 21) is removed by machining. However, since such material removal requires the expense of an additional step for machining, it has been the general practice to provide a space between the upper casing half 22 of the cassette and the gate 21 as shown in FIG. 7 to avoid the gate removing machining step. However, since the guide member 20 will slide vertically on the pin 23 due to forces exerted thereon as the tape 9 travels in contact with the peripheral guide surface of the guide member 20, the gate 21 occasionally will contact the inner surface of the upper casing half 22 thereby imparting an irregular resisting force to the guide member 20 which impedes the smooth rotation thereof.

According to the present embodiment of the invention, there is provided a rotatable guide member which is free of the deleterious consequences of the presence of the gate yet which does not require an extra machining operation in its manufacture.

A rotatable guide assembly provided in accordance with this embodiment of the invention will be described in detail with particular reference to FIGS. 8-10. The rotatable guide member 30 according to this embodiment is constituted by a plastic molded cylindrical body having a hollow bore 30a in which is fitted a pin 33 which extends upwardly from the lower casing half 31 supported by base 32. A reduced diameter portion is provided at the top end region of the guide member 30, the reduced diameter region being situated such that it will not contact the tape during operation. Moreover, a cutout or notch 35 is formed over a segment of the reduced diameter tape-non-contacting portion 34. The gate 37 is formed at the bottom of the cutout or notch 35, i.e., so as to extend from the top end face 36 of the major tape-contacting portion 30b of the guide member 30. As seen in FIG. 9, the height b of the tape contacting portion 30b of the guide member 30 is subject only to the requirement that it be greater than the height c of the tape window defined by the front walls 38 and 39 of the lower and upper casing halves 31 and 31' so that the height a of the reduced diameter tape-non-contacting portion 34 can be chosen within wide limits provided that it is not greater than the distance d between the upper casing half 31' and the top end face 36 of the major tape-contacting portion 30b and not smaller than the height of the gate 37. A flange 40 is provided at the lower end of the guide member 30 as in the previously described embodiment.

A third embodiment of the invention is illustrated in FIG. 10. In this embodiment, the major tape-contacting portion of the guide member 45 and the non-contacting portion are not of different diameter. Rather, the cutout or notch 41 and gate 42 formed in the guide member 45 are at a sufficiently high position relative to the height of the tape window c mentioned in relation to FIG. 9. The guide member 45 according to this embodiment is also provided with a flange 46 at its lower end as in the previously described first embodiment.

The rotatable guide members according to the above-described second and third embodiments are thus so constructed that the gate formed at the time of plastic molding is not exposed, i.e., does not protrude beyond and is recessed below, the top end face of the guide member so that there is no possibility that the gate will come into contact with the upper casing half of the cassette to cause improper rotation of the guide member. Moreover, no additional step is required for removal of the gate. The entire guide member assembly remains free from any problems resulting from the fluid lubricant possibly accumulating on and adhering to the peripheral surface of the guide member as described above.

Figure 11:
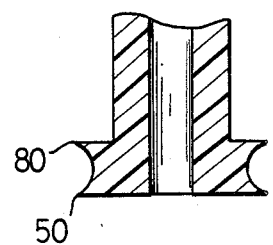
FIG. 11 is an enlarged sectional view of a lower portion of still another embodiment of guide means for use in the rotatable guide assembly of the present invention.
Figure 12:
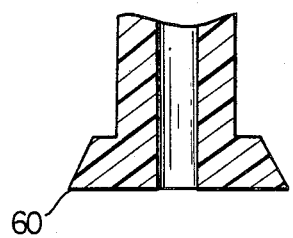
FIG. 12 is a view similar to FIG. 11 illustrating yet another embodiment of guide means for use in connection with the present invention.
Figure 13:
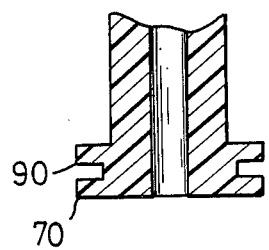
FIG. 13 is a view similar to FIG. 11 illustrating still yet another embodiment of guide means for use in connection with the guide member assembly of the present invention.

Various possible constructions of embodiments of the flange portion of rotatable guide members in accordance with the present invention are illustrated in FIGS. 11-13.

In these figures, the numerals 50, 60 and 70 designate the sharp peripheral edge portions formed at the bottom corner of the flange portion in each embodiment while each of the numerals 80 and 90 designate a second sharp peripheral edge portion formed on the respective flange portion.

According to these embodiments, the desired lubricant flinging or throwing effect resulting from the action of centrifugal force produced by the rotation of the guide member is significantly enhanced due to the presence of the sharp edge portions 50, 60, 70, 80 and 90 of the flange.

In particular, FIG. 11 illustrates a flange whose peripheral surface is formed with a concave cross section to define upper and lower sharp peripheral edge portions having substantially equal diameter. In the embodiment of FIG. 12, the flange is formed with an upwardly and inwardly tapering peripheral surface to define a lower sharp peripheral edge portion 60. In the embodiment of FIG. 13, an annular channel is formed in the peripheral surface of the flange to define the first and second sharp peripheral edge portions 70 and 90.

It will thus be seen that the objects set forth above, among those other objects made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. In a cassette for data carrying material, a guide member assembly for guiding the data carrying material along a predetermined path of travel, comprising:
    a support base provided on said cassette, said support base comprising a protuberance having a substantially flat top end face;
    supporting shaft means mounted on said support base;
    guide means rotatably mounted on said supporting shaft means, said guide means including a cylindrical body having a data carrying material guiding surface and upper and lower end regions and including a tubular portion provided between said data carrying material guiding surface of said cylindrical body and an upper end face thereof;
    a fluid lubricant applied between said supporting shaft means and guide means;

means for preventing said fluid lubricant from accumulating on and adhering to said data carrying material guiding surface of said guide means, said preventing means comprising a flange extending outwardly from the lower end region of said cylindrical body, said flange being spaced from the flat top end face of said support base and having a diameter which is greater than the substantial diameter of the flat top end face of said support base;

a cutout formed in the upper end region of said cylindrical body and provided in said tubular portion and extending entirely through thickness of said tubular portion between said supporting shaft means and said guiding surface;

wherein a gate formed on said cylindrical body during a plastic molding operation is positioned within said cutout and inwardly of the upper end face of said cylindrical body;

said guide means cylindrical body includes a section provided with said data carrying material guiding surface on an outer surface thereof;

said tubular portion has a smaller outer diameter than an outer diameter of said data material guiding surface section of said cylindrical body, and inner diameters of said tubular portion and said guiding surface section being substantially the same;

the gate is formed on an upper edge of said guiding surface section, to extend away from said upper edge of said guiding surface section and towards said upper end face;

additionally comprising upper and lower casing halves defining said cassette, which comprise front walls defining a window therebetween;

wherein said support base is provided on the lower one of the upper and lower casing halves;

said tubular portion has an axial length greater than axial height of the gate;

said guiding surface has an axial length greater than height of the window defined by the front walls of the upper and lower casing halves; and the axial length of said tubular portion is smaller than distance between an inner surface of the upper casing half and the upper edge of said guiding surface section when said guide means are mounted on said supporting shaft means in said cassette.

2. The combination of claim 1 wherein said cylindrical body is formed of a material selected from the group consisting of Teflon and polyacetal resin.

3. The combination of claim 1 wherein said flange has a sharp peripheral edge portion.

4. The combination of claim 3 wherein said sharp peripheral edge portion is formed at an end corner of said flange.

5. The combination of claim 4 wherein said flange has an upwardly and inwardly tapering peripheral surface defining said sharp peripheral edge portion.

6. The combination of claim 3 wherein said flange has a pair of said sharp peripheral edge portions.

7. The combination of claim 6 wherein said flange has a peripheral surface having a concave cross-section to define said pair of sharp peripheral edge portions.

8. The combination of claim 6 wherein said flange includes an annular channel formed in the peripheral surface thereof to define said pair of sharp peripheral edge portions.

9. The combination of claim 1 wherein said tubular portion has a cylindrical configuration.

10. The combination of claim 1, wherein said flange is substantially cylindrical in shape.

* * * * *